(12) United States Patent
Endo et al.

(10) Patent No.: US 7,170,487 B2
(45) Date of Patent: Jan. 30, 2007

(54) POINTING DEVICE AND METHOD OF PRODUCING THE SAME

(75) Inventors: Jun Endo, Sabae (JP); Teruyoshi Mukaihira, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 561 days.

(21) Appl. No.: 10/728,464

(22) Filed: Dec. 5, 2003

(65) Prior Publication Data

US 2005/0007338 A1    Jan. 13, 2005

(30) Foreign Application Priority Data

| Jan. 20, 2003 | (JP) | ............................. 2003-010634 |
| Jan. 20, 2003 | (JP) | ............................. 2003-010635 |
| Sep. 26, 2003 | (JP) | ............................. 2003-334529 |
| Sep. 26, 2003 | (JP) | ............................. 2003-334530 |

(51) Int. Cl.
   *G09G 5/00*    (2006.01)

(52) U.S. Cl. ...................... 345/156; 345/160; 345/161; 463/37; 341/21

(58) Field of Classification Search ........ 345/156–161; 463/36–38; 341/20, 21
See application file for complete search history.

(56) References Cited

U.S. PATENT DOCUMENTS

| 5,754,167  | A  | * | 5/1998  | Narusawa et al. .......... 345/161 |
| 5,920,310  | A  |   | 7/1999  | Faggin et al. |
| 6,177,924  | B1 |   | 1/2001  | Bae |
| 6,266,046  | B1 | * | 7/2001  | Arita ........................... 345/156 |
| 6,360,622  | B1 | * | 3/2002  | Shibata ....................... 73/866.1 |
| 6,664,666  | B2 | * | 12/2003 | Corcoran ..................... 310/12 |
| 6,693,625  | B2 | * | 2/2004  | Armstrong ................... 345/161 |
| 6,694,236  | B2 | * | 2/2004  | Onodera ....................... 701/36 |
| 6,935,956  | B1 | * | 8/2005  | Ogata et al. .................. 463/38 |
| 2001/0002127 | A1 | * | 5/2001 | Cheng et al. ............... 345/161 |
| 2002/0018048 | A1 | * | 2/2002 | Seffernick et al. .......... 345/161 |
| 2002/0054015 | A1 | * | 5/2002 | Wingett et al. ............. 345/156 |

(Continued)

FOREIGN PATENT DOCUMENTS

CN       2373834       4/2000

(Continued)

OTHER PUBLICATIONS

Official Communication issued in corresponding European Patent Application No. 03029069.6, dated Jun. 20, 2006.

(Continued)

*Primary Examiner*—Richard Hjerpe
*Assistant Examiner*—Kimnhung Nguyen
(74) *Attorney, Agent, or Firm*—Keating & Bennett, LLP

(57) ABSTRACT

A pointing device includes an elastic plate is provided with a perforation or notch through which a pin can be inserted. Terminal electrodes are formed, and then strain resistant elements are formed in the state in which the pin is inserted through the perforation or notch. Thus, variations in the positional relationship between the terminal electrodes and the strain resistant elements are eliminated. A base plate may be provided with a perforation or notch which can receive the pin. The pin is inserted through the notch of the elastic plate. The elastic plate is mounted on the base plate using the pin as a guide. The elastic plate may be made of yttrium-stabilized zirconia.

20 Claims, 7 Drawing Sheets

U.S. PATENT DOCUMENTS

2002/0158841 A1    10/2002    Hirano et al.

FOREIGN PATENT DOCUMENTS

| | | |
|---|---|---|
| CN | 1262478 | 8/2000 |
| EP | 1 022 647 A1 | 7/2000 |
| EP | 1 074 905 A2 | 2/2001 |
| JP | 09-219437 A | 8/1997 |
| JP | 09-321392 A | 12/1997 |
| JP | 11-335804 A | 12/1999 |
| JP | 2000-148383 | 5/2000 |
| JP | 2002-043767 A | 2/2002 |
| JP | 2002-328775 | 11/2002 |

OTHER PUBLICATIONS

Official Communication issued in corresponding European Patent Application No. 03029069.6, dated Sep. 15, 2006.

* cited by examiner

POINTING DEVICE AND METHOD OF PRODUCING THE SAME

BACKGROUND OF THE INVENTION

1. Field of the Invention

The present invention relates to pointing devices and a method of producing the same, and particularly, to pointing devices and a method of producing the same in which variations in qualities of the pointing device are reduced, the production efficiency is enhanced, and the height or thickness of the device is reduced.

2. Description of the Related Art

A conventional pointing device is a called a pointing stick. Pointing sticks are used in information-processing devices such as personal computers, video game players, and other suitable devices which show letters or images on displays. In particular, pointing sticks are used to position cursors or other suitable pointers or to control the operation of information-processing devices.

Generally, a pointing device includes an elastic plate having a plurality of strain-resistant elements and a plurality of terminal electrodes formed on the lower surface thereof. The plurality of terminal electrodes is electrically connected to the plurality of terminals of the strain-resistant elements. The elastic plate has a manipulation post arranged to extend from the center of the upper surface of the elastic plate. The elastic plate is mounted on a base plate. The base plate supports the outer periphery of the elastic plate. The base plate is arranged with a predetermined gap with respect to the lower surface of the elastic plate. The base plate has a plurality of connecting lands electrically connected to the terminal electrodes (for example, see Japanese Unexamined Patent Application Publication No. 2000-148383).

In order to produce the above-described pointing device, a process of forming the terminal electrodes and the strain-resistant elements on the lower surface of the elastic plate is carried out. In this process, thick-film printing is generally used. In particular, first, the elastic plate is supplied to a printing station for formation of the terminal electrodes in which the terminal electrodes are thick-film printed. Thereafter, the elastic plate is supplied to a printing station for formation of the strain-resistant elements in which the strain-resistant elements are formed by thick-film printing. To reduce variations in the qualities or characteristics of the produced pointing devices, it is important to keep constant the positional relationship between the strain-resistant elements and the terminal electrodes.

However, in many cases, the plane-shapes of elastic plates are rotation-symmetric. Therefore, the following problems occur.

The plurality of strain-resistant elements are printed in a rotation-symmetrical pattern on the lower surface of the elastic plate. Therefore, when the strain-resistant elements are printed in the second printing station after the terminal electrodes are printed in the first printing station, the strain-resistant elements may be correctly printed even if the alignment of the elastic plate in the first printing station is different from that in the second printing station. However, a printing apparatus used in the first printing station has inevitable errors, and a printing apparatus used in the second printing station has inevitable errors. Therefore, if the position in the rotational direction of the elastic plate in the first printing station is different from that in the second printing station, a slight positional shift is caused between the terminal electrodes and the strain-resistant elements. This positional shift causes variations in qualities or characteristics of the produced pointing devices.

For the process of mounting the elastic plate onto the base plate, it is important to correctly position the elastic plate and the base plate to each other. That is, in the mounting process, the plurality of terminal electrodes on the elastic plate side and the plurality of connecting lands on the base plate side must be accurately positioned, respectively. However, it is substantially impossible to visually confirm the terminal electrodes formed on the lower surface of the elastic plate and the connecting lands on the upper surface of the base plate at the same time. As a result, this causes the yield of pointing devices to be reduced. For this positioning, a relatively long time is required.

If the elastic plate is mounted by means of an automatic machine, the positioning can be carried out without the visual confirmation being made. However, in this case, great investment in plant equipment is required.

Referring to the pointing device described in Japanese Unexamined Patent Application Publication No. 2000-148383, the ability to reduce the height of the device is limited. In particular, in order to reduce the height of the pointing device, it is effective to reduce the thickness of the parts of the pointing device excluding the manipulation post, especially, the thicknesses of the elastic plate and the base plate. To keep the deflection of the elastic plate constant, the rigidity of the base plate must be ensured. Thus, it is impossible to significantly reduce the thickness of the base plate. If the thickness of the elastic plate is reduced, the elastic plate may be broken during operation of the device using the manipulation post. Thus, the thickness of the elastic plate cannot significantly be reduced.

Referring to the arrangement containing a flexible wiring substrate shown in FIG. 7 of Japanese Unexamined Patent Application Publication No. 2000-148383, the elastic plate is allowed to be deflected by a receiving part arranged to pass through a fixing piece. Accordingly, to realize the alignment of the pointing device with high precision, the center of the elastic plate (i.e., the center of the manipulation post attached to the elastic plate) and the center of the receiving part of the fixing piece must be positioned relative to each other with high precision. If the center of the elastic plate and the center of the receiving part of the fixing piece are shifted from each other, the deformation ratios of the elastic plate, obtained when the manipulation post is tilted, is different in the X and Y directions. Thus, high precision alignment becomes impossible.

However, according to the arrangement shown in FIG. 7 of Japanese Unexamined Patent Application Publication No. 2000-148383, a mechanical engagement part, formed by bending a pressing part provided on the fixing piece and then caulking, has a function of positioning the elastic plate and the fixing piece with respect to each other with high precision. Accordingly, it is difficult to position the center of the elastic plate and the center of the receiving part of the fixing piece with high precision. Thus, it is difficult to realize high precision alignment by use of the pointing device.

SUMMARY OF THE INVENTION

To overcome the problems described above, preferred embodiments of the present invention provide a pointing device and a method of producing the same which has a reduced height and whose alignment can be detected with high precision.

According to the first preferred embodiment of the present invention, a pointing device includes an elastic plate having a plurality strain resistant elements disposed on the lower surface of the elastic plate, a plurality of terminal electrodes disposed on the lower surface of the elastic plate, and a manipulation post arranged to extend from the center of the upper surface of the elastic plate, the plurality of terminal electrodes being electrically connected to the plurality of strain resistant elements, and a base plate on which the elastic plate is mounted and which supports the outer periphery of the elastic plate, the base plate being arranged at a predetermined gap with respect to the lower surface of the elastic plate and having plurality of connecting lands electrically connected to the terminal electrodes, respectively, the elastic plate having a perforation or notch in at least one position thereof, the perforation or notch being arranged such that a pin can be inserted therein, and the elastic plate having a plane shape which is not rotation-symmetric.

The rotational alignment of the elastic plate can be kept constant by inserting the pin through the perforation or notch and utilizing the plane shape of the elastic plate.

Preferably, the elastic plate has perforations or notches in at least two positions thereof. The perforations or notches are arranged such that pins can be inserted therein.

Preferably, the base plate is provided with a perforation or notch which can receive a pin such that when the pin is inserted through the perforation or notch of the elastic plate mounted in a predetermined position.

Preferably, the base plate has a concavity formed in the upper surface thereof, and the elastic plate is mounted in the concavity. Thereby, the height of the pointing device is reduced.

The elastic plate is preferably made of zirconia, a zirconia-type, or yttrium-stabilized zirconia ceramic.

According to another preferred embodiment of the present invention, a method of producing a pointing device includes a step of forming the strain resistant elements and the terminal electrodes while a pin is inserted through the perforation or notch formed in the elastic substrate so that the elastic plate is positioned.

A pointing device which includes an elastic plate having a plurality of strain resistant elements disposed on the lower surface of the elastic plate, a plurality of terminal electrodes disposed on the lower surface of the elastic plate, and a manipulation post arranged to extend from the center of the upper surface of the elastic plate, the plurality of terminal electrodes being electrically connected to the plurality of strain resistant elements, and a base plate on which the elastic plate is mounted and which supports the outer periphery of the elastic plate, the base plate being arranged at a gap with respect to the lower surface of the elastic plate and having a plurality of connecting lands electrically connected to the terminal electrodes.

Preferably, the base plate includes a metallic plate and a flexible wiring substrate arranged on the upper surface of the metallic plate and having connecting lands disposed thereon. The elastic plate is mounted on the metallic plate via the flexible wiring substrate. The plurality of terminal electrodes is disposed on the elastic plate and the plurality of connecting lands is disposed on the flexible wiring substrate are arranged in a circle and are electrically connected to each other via an electroconductive bonding-material. A predetermined gap is formed between the lower surface of the elastic plate and the upper surface of the flexible wiring substrate, and the elastic plate can be deformed because of the predetermined gap.

Preferably, the electroconductive bonding material is solder which is applied by re-flowing.

For reduction of the height of the device, the base plate has a concavity formed thereon, and the elastic plate is mounted in the concavity.

Preferably, the base plate includes a metallic plate and a flexible wiring substrate arranged on the upper surface of the metallic plate and having the connecting lands formed thereon. The metallic plate has the concavity formed on the upper surface thereof. The metallic plate has a convexity formed on the lower surface thereof in the position corresponding to the concavity. The flexibility wiring substrate is arranged to extend in the concavity, and the elastic plate is mounted in the concavity via the flexible wiring substrate.

Preferably, the pointing device further includes a support for supporting the metallic plate from the lower surface side thereof, and the support has a hole or concavity which receives the convexity of the metallic plate.

The elastic plate preferably has a perforation or notch formed in at least one position thereof. The perforation or notch is such that a pin can be inserted through the perforation or notch. The base plate is preferably provided with a perforation or notch which can receive a pin when the pin is inserted through the perforation or notch of the elastic plate mounted in a predetermined position.

Preferably, the elastic plate has perforations or notches in at least two positions thereof, the perforations or notches being such that a pin can be inserted therein, and the elastic plate has a plane shape which is not rotation-symmetric.

Preferably, the elastic plate is made of zirconia, a zirconia-type, or yttrium-stabilized zirconia ceramic.

The elastic plate has a perforation or notch in at least one position thereof, the perforation or notch being such that a pin can be inserted therein, and the elastic plate has a plane shape which is not rotation-symmetric. Therefore, the rotational alignment of the elastic plate can be kept constant by inserting a pin through the perforation or notch and utilizing the plane shape of the elastic plate.

Thus, the strain resistant elements and the terminal electrodes are formed while the elastic plate is positioned as described above. Therefore, when the strain resistant elements and the terminal electrodes are positionally shifted from each other, the positional-shift is kept constant, and therefore, the positional relationship between the strain resistant elements and the terminal electrodes is prevented from being changed, depending on produced pointing devices. Thus, pointing devices having stable qualities or characteristics are achieved.

When the elastic plate has perforations or notches in at least two positions thereof, the perforations or notches being such that pins can be inserted therein, respectively, as described above, the elastic plate can be positioned more accurately. Thus, the reliability of the constant positional relationship between the strain resistant elements and the terminal electrodes is further enhanced.

Moreover, when the base plate is provided with a perforation or notch which can receive a pin and when the pin is inserted through the perforation or notch of the elastic plate mounted in a predetermined position, the positioning between the elastic plate and the base plate onto which the elastic plate is to be mounted is carried out easily and efficiently. Accordingly, pointing devices are produced at a high yield without having to use an expensive automatic machine. Moreover, the time required for assembly of the pointing device is reduced.

Preferably, the base plate has a concavity formed in the upper surface thereof, and the elastic plate is mounted in the concavity. Thereby, the height of the pointing device is reduced correspondingly to the depth of the concavity. When the concavity is formed in the upper surface of the base plate, the connecting lands in the concavity are visually confirmed with more difficulty. The effects of the easy, efficient positioning between the elastic plate and the base plate for mounting of the elastic plate as described above becomes more significant.

For high precision alignment of the pointing device, it is important that the elastic plate can be deformed at a constant ratio in the X and Y directions depending on the tilting of the manipulation post.

Preferably, the base plate includes a metallic plate. The metallic plate includes a flexible wiring substrate disposed on the upper surface of the metallic plate and the plurality of connecting lands disposed on the upper surface of the metallic plate. The elastic plate is mounted on the metallic plate via the flexible wiring substrate. The terminal electrodes and the flexible wiring plates are electrically connected to each other via an electroconductive bonding-material while a predetermined gap is formed between the lower surface of the elastic plate and the upper surface of the flexible wiring substrate. The elastic plate can be deformed because of the predetermined gap. Thus, the elastic plate can be deformed at a constant ratio depending on the tilting of the manipulation post provided that the plurality of terminal electrodes and the plurality of connecting lands are electrically connected to each other while they are positioned to each other. Accordingly, with the pointing device according to this preferred embodiment of the present, high precision alignment becomes possible.

When the flexible wiring substrate is arranged between the elastic plate and the metallic plate for supporting the elastic plate, the flexible wiring substrate can be connected directly to a logic board. Thus, a pointing device having an inexpensive, simple structure is provided.

Preferably, the electroconductive bonding material is solder which is applied by re-flowing. Even if the elastic plate is shifted from a desired position on the flexible wiring substrate, the elastic plate can be recovered to the desired position because of the surface tension of the solder. Thus, the corrective self-alignment action works to a relatively large degree. Accordingly, the plurality of terminal electrodes and the plurality of connecting lands are positioned with each other more accurately and easily. Thus, the pointing device which realizes precise alignment is provided.

Preferably, the base plate has a concavity formed in the upper surface thereof, and the elastic plate of the sensor unit of the device is mounted in the concavity. Thus, the height of the pointing device is reduced correspondingly to the depth of the concavity, while the thickness of the elastic plate is maintained. That is, the strength of the elastic pate is prevented from being decreased.

Preferably, the base plate includes a metallic plate and a flexible wiring substrate arranged on the upper surface of the metallic plate and having the connecting lands formed thereon. The metallic plate has the concavity formed on the upper surface of the metallic plate, and the metallic plate has a convexity formed on the lower surface thereof in the part thereof corresponding to the concavity. Thus, advantageously, the height of the pointing device is reduced while the rigidity of the metallic plate is prevented from being decreased in the convexity. The concavity and the convexity can be formed with the thickness of the metallic plate being kept substantially constant, by plate working. Thus, a bent portion of the metallic plate is formed between the part of the metallic plate in which the convexity and the concavity are formed and the other part of the metallic plate. Therefore, the bent portion has a rib-effect by which the strength is further enhanced.

Preferably, the support has a hole or concavity which receives the convexity of the metallic plate. Thereby, in the state in which the pointing device is fixed to the support provided on a keyboard, for example, increasing of the thickness of the device, which may be caused by the convexity of the metallic plate, does not occur. Thus, the reduction in the height as described above is not deteriorated.

Preferably, the elastic plate has a perforation or notch formed in at least one position thereof, the perforation or notch being arranged such that a pin can be inserted through the perforation or notch. Thereby, positioning of the strain resistant elements and the terminal electrodes in the process of forming them can be ensured. Moreover, positioning of the elastic plate relative to the base plate during the process of mounting the elastic plate onto the base plate can be ensured with high efficiency. These arrangements solve problems such as high precision alignment.

Preferably, the base plate is provided with a perforation or notch which can receive a pin when the pin is inserted through the perforation or notch of the elastic plate mounted in a predetermined position. The above-described positioning is carried out more securely and efficiently.

Preferably, the elastic plate has perforations or notches in at least two positions thereof. The perforations or notches are such that pins can be inserted therein, and the elastic plate has a plane shape which is not rotation-symmetric. The elastic plate can be securely positioned in the rotational direction because of the above-described perforations or notches. Thus, the positional shift between the strain resistant elements and the terminal electrodes provided on the elastic plate is prevented. The positional-shifting state thereof is prevented from being changed.

Thus, variations in qualities or characteristics between pointing devices is reduced. Thus, the yield is enhanced, and the assembly process for the pointing device is more efficient.

Preferably, the concavity is formed in the upper surface of the base plate. Thus, it is more difficult to visually confirm the connecting lands provided in the concavity. Accordingly, the above-described convenient, efficient positioning between the elastic plate and the base plate, carried out when the elastic plate is mounted onto the base plate, becomes more advantageous.

Preferably, the elastic plate is made of a zirconia, a zirconia-type, or a yttrium-stabilized zirconia ceramic. Zirconia, zirconia-type, and yttrium-stabilized zirconia ceramics have a high bending strength. Thus, the elastic plate having a high cracking resistance is formed, even if the plate has a small thickness. Moreover, because the Young's modulus is low, the elastic plate can be formed to be flexible. Accordingly, this contributes to reduction of the size and height of the pointing device, and also, the sensitivity of the pointing device is enhanced.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
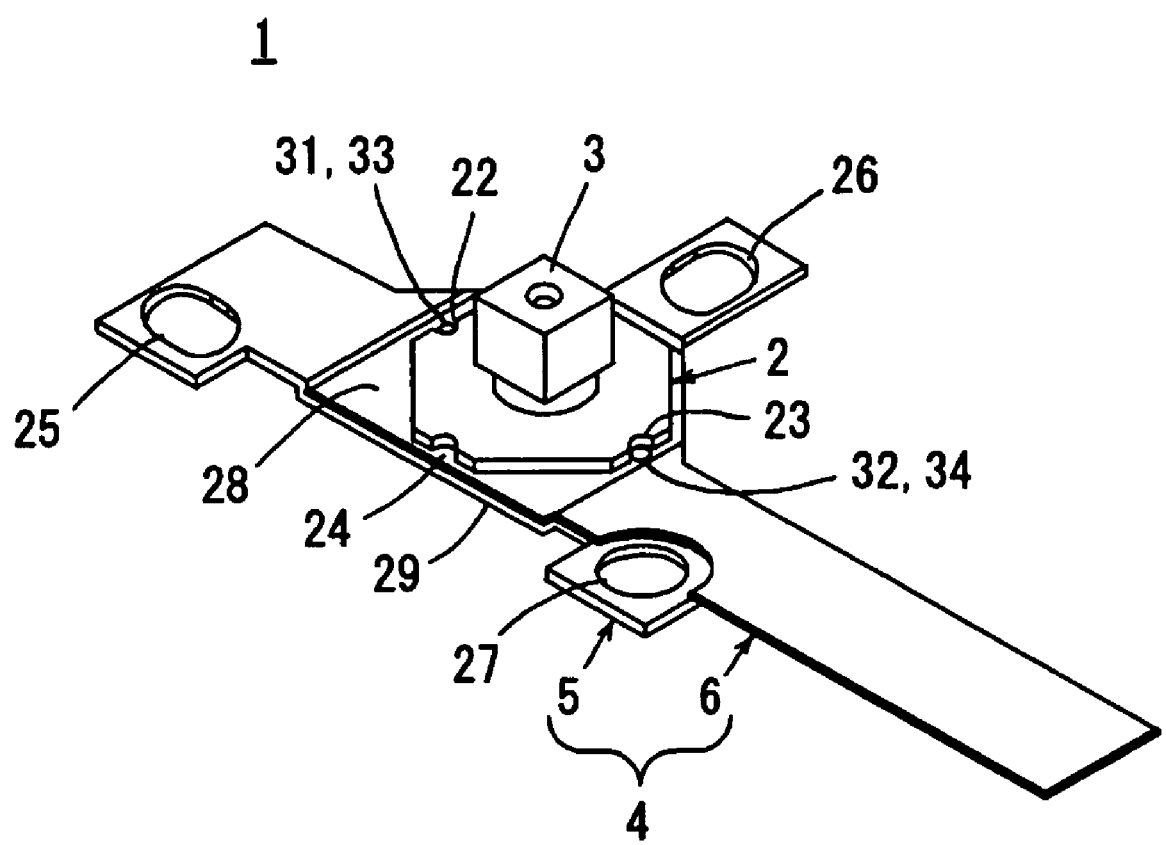
FIG. 1 is a perspective view showing the appearance of a pointing device according to the preferred embodiment of the present invention.
Figure 2:
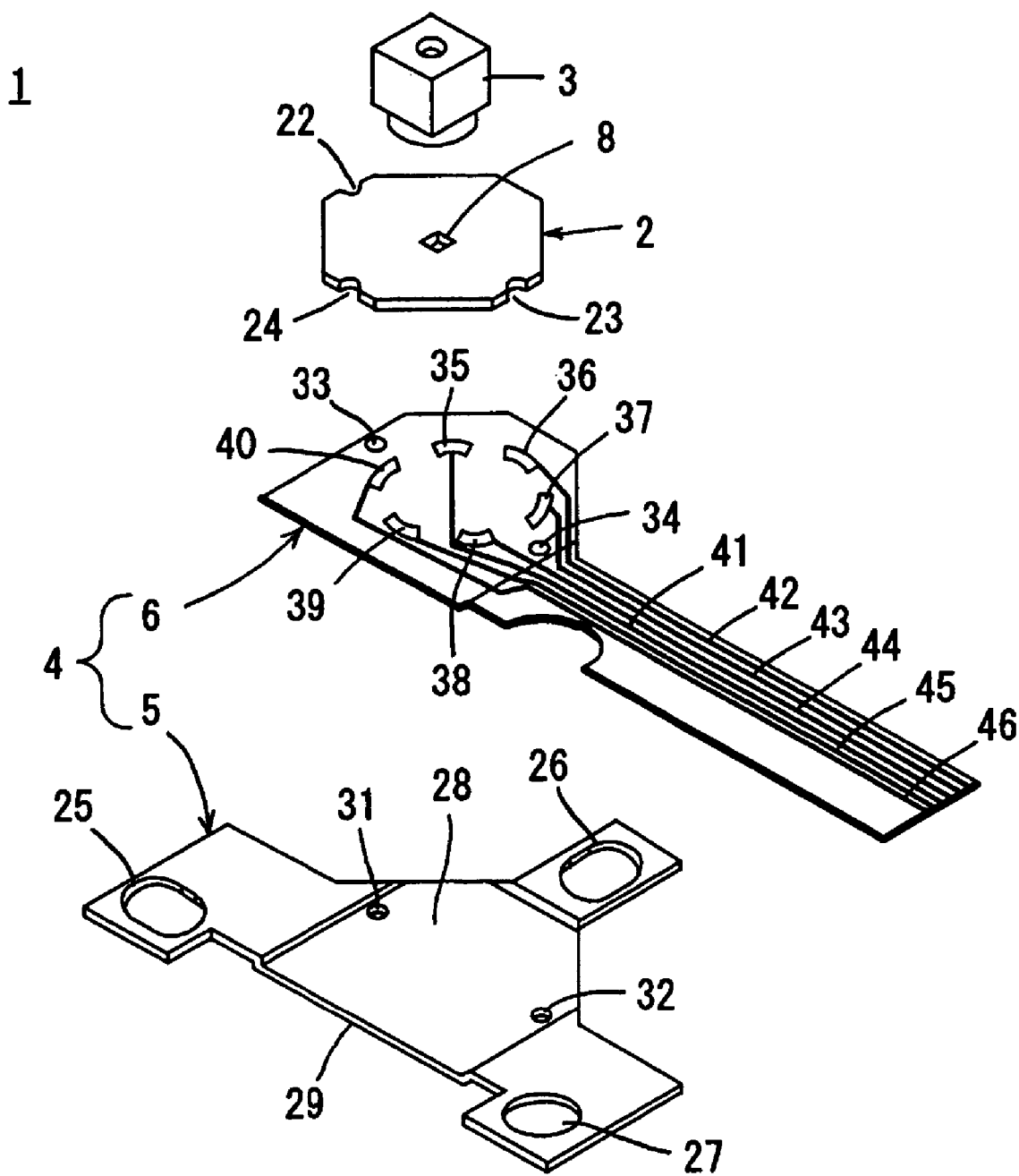
FIG. 2 is an exploded view of the pointing device of FIG. 1.

FIG. 1 is a perspective view showing the pointing device 1 according to the first preferred embodiment of the present invention. FIG. 2 is an exploded view of the components of the pointing device 1 shown in FIG. 1.

As shown in FIG. 2, the pointing device 1 includes an elastic substrate 2, a manipulation post 3 attached to the elastic substrate 2, a metallic plate 5 of a base plate 4, and a flexible wiring substrate 6.

Figure 3:
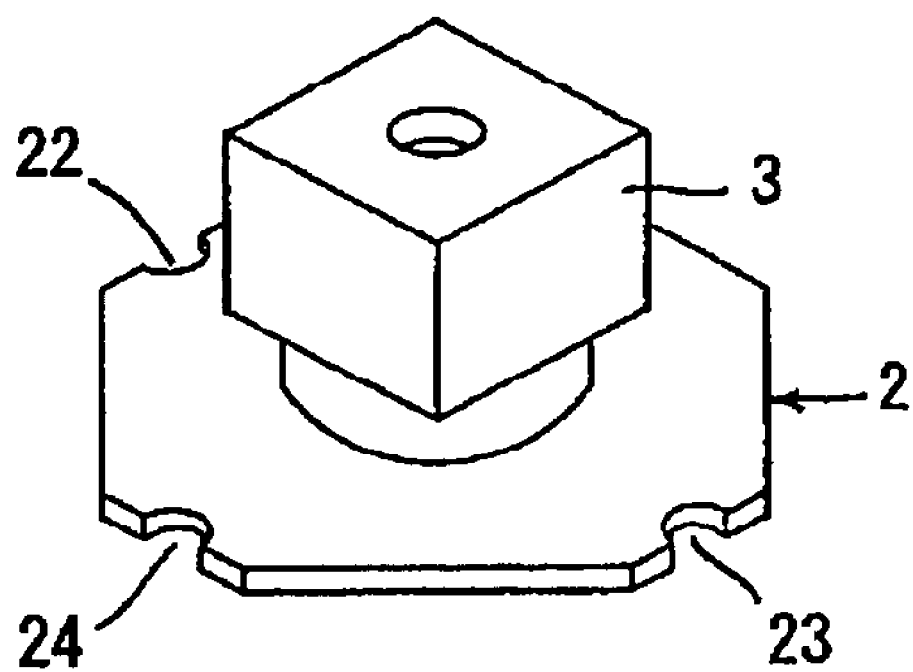
FIG. 3 is an enlarged perspective view of a portion of the pointing device of FIG. 1.
Figure 4:
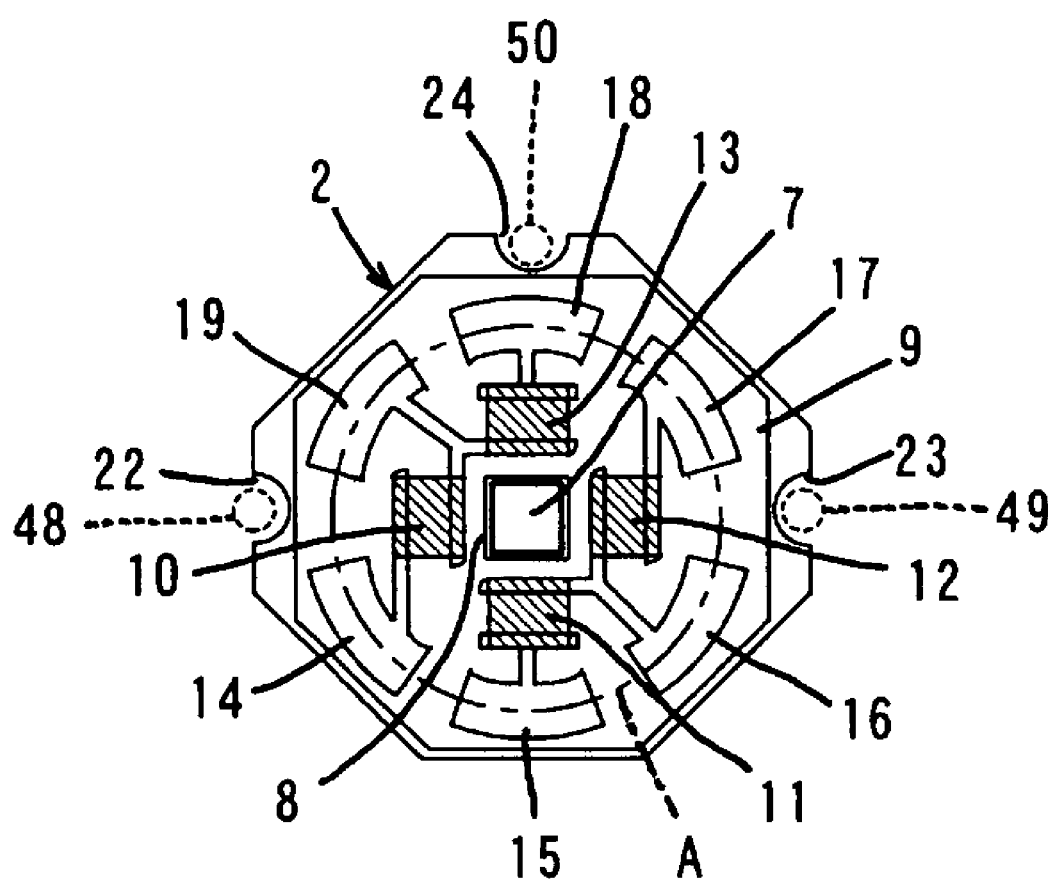
FIG. 4 is a bottom view of the elastic plate of FIG. 3.

FIG. 3 is a perspective view showing the elastic substrate 2 having the manipulation post 3 attached thereto which functions as a sensor unit. FIG. 4 is a bottom view of the elastic substrate 2.

The manipulation post 3 extends from the center of the upper surface of the elastic substrate 2. The manipulation post 3 is bonded to the elastic substrate 2. To enhance the reliability of the fixing state of the manipulation post 3, a square-pillar-shaped protuberance 7 is disposed in the lower end of the manipulation post 3 as shown in FIG. 4. A square hole 8 is formed in the center of the elastic plate 2. The protuberance 7 is fitted in the hole 8. According to this structure, the manipulation post 3 is easily positioned at the center of the elastic plate 2, even if special positioning elements are not used. Moreover, the mechanical strength in the X-Y direction for the manipulation post 3 is enhanced.

The elastic plate 2 is preferably made of ceramic from the standpoint of low noise. The plate 2 is preferably made of metal from the standpoint of cost-reduction.

When the elastic plate 2 is preferably made of metal, glass paste is applied to the lower surface of the elastic plate 2 and fired. Thus, an electrical insulating film 9 is formed as shown in FIG. 4.

For the elastic plate 2 made of ceramic, it is not necessary to form the electrical insulating film 9. Zirconia or zirconia-type ceramics are preferably used as the ceramics for the elastic plate 2. More preferably, yttrium-stabilized zirconia is used. Zirconia or zirconia-type ceramics have a high bending strength. Thus, the elastic plate 1 having a high cracking resistance is formed, even if the plate has a small thickness. The yttrium-stabilized zirconia has an especially high bending strength of about two-thirds of that of alumina. The zirconia or zirconia-type ceramics have a low Young's modulus. Thus, the elastic plate having a high flexibility is formed. The yttrium-stabilized zirconia has an especially low Young's modulus of about two-thirds of that of alumina. Thus, the pointing device 1 is reduced in size and height, and the sensitivity of the pointing device 1 is enhanced by using zirconia or zirconia-type ceramics or more preferably yttrium-stabilized zirconia to form the elastic plate 2.

The plurality of strain resistant elements preferably includes four strain resistant elements 10, 11, 12, and 13. The four strain resistant elements 10, 11, 12, and 13 are disposed on the lower surface of the elastic plate 2. These elements preferably include resistor films. The strain resistant elements 10 to 13 are preferably arranged at angular intervals of approximately 90° with respect to the hole 8 as a center to which the manipulation post 3 is attached.

The plurality of terminal electrodes preferably includes six terminal electrodes. The six terminal electrodes 14, 15, 16, 17, 18, and 19 are disposed on the lower surface of the elastic plate 2 and are connected to the respective terminals of the strain resistant elements 10 to 13. These terminal electrodes 14 to 19 are formed of conductor films and are arranged to as to be distributed in a circle A (shown by a long and short dotted line in FIG. 4) centered about the center axis of the manipulation post 3.

The elastic plate 2 is provided, in at least one position thereof, with a perforation or notch into which a pin 20 or 21 (see FIG. 5) can be inserted. In addition, the elastic plate 2 has a plan shape which is not rotational-symmetric. In this preferred embodiment of the present invention, the perforations or notches 22, 23, and 24 are provided in three positions in the peripheral portion of the elastic plate 2.

An overcoat layer (not shown) is preferably formed by firing glass-paste to cover the strain resistant elements 10 to 13 and so as not to cover the main parts of the terminal electrodes 14 to 19.

Referring to FIG. 2, the metallic plate 5 of the main part of the base plate 4 is preferably made of iron or an iron alloy. The metallic plate 5 is preferably substantially T-shaped. When the metallic plate 5 is made of iron or iron alloy, the surface of the metallic plate is preferably anti-rusting-treated. The metallic plate 5 has three projected portions in which fixing holes 25, 26, and 27 are formed, respectively. Holes 25 and 26 have a longer size in one direction thereof. Moreover, the longer size direction of the fixing hole 25 and that of the fixing hole 26 are substantially perpendicular to each other.

A concavity 28 is formed in the center of the upper surface of the metallic plate 5. The concavity 28 is formed by plate-working. Thus, a convexity 29 is formed in the position corresponding to the concavity 28, on the lower surface side of the metallic plate 5. The area of the concavity 28 can be optionally determined provided that the elastic plate 2 can be received in the area. Moreover, the depth of the concavity 28 is selected in such a manner that at least a part of the elastic plate 2 in the thickness direction can be received in the concavity 28. Preferably, the projected size of the convexity 29 is set so as to correspond to the thickness of a support 30 which supports the metallic plate 5 (see FIG. 6) from the lower surface side thereof while the pointing device 1 is in the fixed state as described below.

Perforations or notches are formed at the positions in the concavity 28 of the metallic plate 5 which correspond to the positions of the notches 22 and 23 formed in the elastic plate 2. The perforations or notches can receive the pins 20 and 21 (see FIG. 5). In this preferred embodiment, the perforations or notches are represented by numerical references 31 and 32.

The flexible wiring substrate 6 forms a part of the base plate 4 and is arranged on the upper surface of the metallic plate 5. For example, the substrate 6 is bonded to the metallic plate 5 with an adhesive or tacky-adhesive. The flexible wiring substrate 6 is bent to extend along the concavity 28 of the metallic plate 5. Perforations 33 and 34 are formed in the flexible wiring substrate 6 to be continuous with the perforations 31 and 32, respectively, formed in the metallic plate 5.

Figure 5:
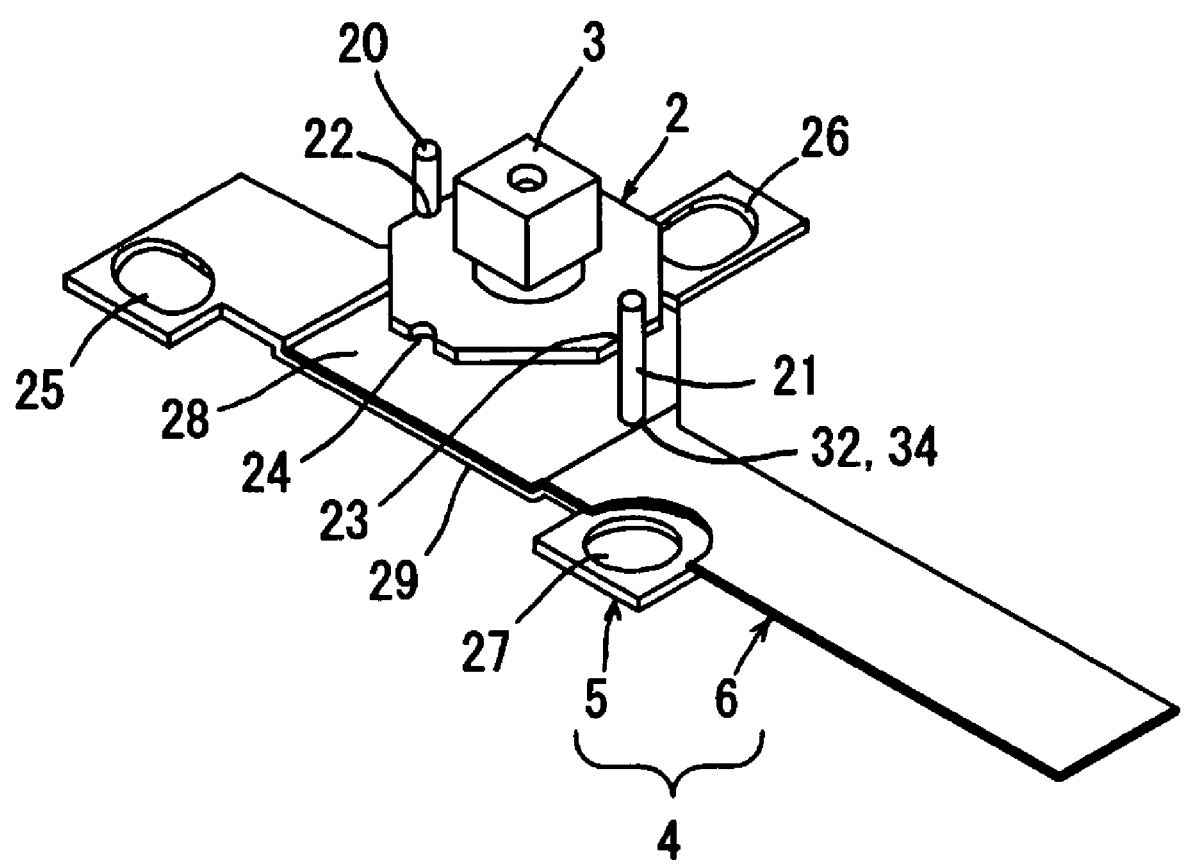
FIG. 5 is a perspective view showing a process of mounting the elastic plate onto the base plate.

The plurality of connecting lands 35, 36, 37, 38, 39, and 40 are disposed on the flexible wiring substrate 6 to electrical connect with the terminal electrodes 14 to 19 disposed on the elastic plate 2. The connecting lands 35 to 40 are arranged in a circle A (see FIG. 4) centered around the center axis of the manipulation post 3 as well as the terminal electrodes 14 to 19. Moreover, conductor lines 41, 42, 43, 44, 45, and 46 are connected to the connecting lands 35 to 40, respectively. In FIGS. 1 and 5, the connecting lands 35 to 40 and the conductor lines 41 to 46 are not shown.

As shown in FIG. 1, the elastic plate 2 is mounted in the concavity 28 of the metallic plate 5 via the flexible wiring substrate 6. In particular, solder is provided on the elastic plate 2 in such a manner that the terminal electrodes 14 to 19 disposed on the elastic plate 2 can be electrically connected to the connecting lands 35 to 40 disposed on the flexible wiring substrate 6, respectively. The solder is reflowed, or a conductive adhesive is used, so that the elastic plate 2 is fixed to the flexible wiring substrate 5 and, thus, to the base plate 4. The terminal electrodes 14 to 19 are arranged on the outer peripheral portion of the elastic plate 2. Thus, the outer peripheral portion of the elastic plate 2 is held by the base plate 4.

The thicknesses of the solder or the conductive adhesive and the respective terminal electrodes 14 to 19 causes a predetermined gap 47 (see FIG. 6) to be formed between the lower surface of the elastic plate 2 and the upper surface of the base plate 4, i.e., the upper surface of the flexible wiring substrate 6.

When the manipulation post 3 which functions as a loading point is tilted, the solder or the conductive adhesive applied to one of the terminal electrodes 14 to 19 functions as a fulcrum, and the crossing point between the manipulation post 3 and the elastic plate 2 functions as the acting point. Thus, the elastic plate 2, which can be elastically deflected due to the existence of the gap 47, is deformed. That is, the gap 47 allows the elastic plate 2 to be deformed.

One of the strain resistant elements 10 to 13 is deformed to generate a strain corresponding to the deformation of the elastic plate 2. The resistance of the strain resistant elements 10 to 13 that are strained is changed. Which of the strain resistant elements 10 to 13 is strained depends on the tilting direction of the manipulation post 3.

For example, when the tilting of the manipulation post 3 is carried out for the stain-resistance element 10, the strain resistant element 10 is deformed to become convex, and the strain resistant element 12 positioned in opposition to the strain resistant element 12 is deformed to become concave. On the one hand, this deformation causes the resistance of the strain resistant element 10 to be increased. On the other hand, the resistance of the strain resistant element 12 is decreased. Then, referring to the other strain resistant elements 11 and 13, only a torsional stress, generated with respect to the direction in which the current flows through the elements 11 and 12, is applied to them. Therefore, the resistance is changed to a negligible degree.

In the pointing device 1, the four strain resistant elements 10 to 13 are wired via the terminal electrodes 14 to 19, the connecting lands 35 to 40, and the conductor lines 41 to 46 to form a bridge circuit. Thus, voltage is applied across two predetermined terminals of the bridge circuit. Thereby, the changes of the resistances of the strained strain resistant elements 10 and 12 as described above can be detected as the change of the voltage across the other two terminals.

When the manipulation post 3 is tilted in another direction, the direction and strength of the tilting can be measured as an electrical signal. Moreover, when a manipulating force is applied to the manipulation post 3 in the axial direction, all of the strain resistant elements 10 to 13 are strained in the same direction. Thus, the manipulation and the strength in the axial direction can be measured as an electrical signal.

Hereinafter, a method of producing the pointing device 1 will be described.

First, the elements shown in FIG. 2, the elastic plate 2, the manipulation post 3, the metallic plate 5, and the flexible wiring substrate 6, are prepared.

Referring to the preparation of the elastic plate 2, as shown in FIG. 4, the following processes are carried out: a process of forming an electrical insulating film 9 on the lower surface of the elastic plate 2, if necessary; a process of forming the terminal electrodes 14 to 19; a process of forming the strain resistant elements 10 to 13; and a process of firing glass paste while the paste covers the strain resistant elements 10 to 13 and does not cover the main parts of the terminal electrodes 14 to 19 to form an overcoat film (not shown).

Ordinarily, these processes are carried out by sequentially supplying the elastic plate 2 to different printing stations, where predetermined thick-films are printed. The electrical insulating film 9, the strain resistant elements 10 to 13, the terminal electrodes 14 to 19, and the overcoat film must be positioned with respect to each other. It is especially important to accurately position the strain resistant elements 10 to 13 and the terminal electrodes 14 to 19 with respect to each other.

Therefore, according to this preferred embodiment of the present invention, the pins 48, 49, and 50 are inserted into the notches 22, 23, and 24 of the elastic plate 2, respectively, so that the elastic plate 2 is positioned, as shown by a broken line in FIG. 4. The notches 22 and 23 are opposed to each other at an angle of approximately 180° in the elastic substrate 2. No notch is opposed to the notch 24. That is, the elastic plate 2 has a plane shape which is not rotation-symmetric.

Accordingly, the elastic plate 2 is maintained at a constant position not only in the plane direction but also in the rotation direction when it is supplied to the different printing stations. Thus, printing-mismatch is prevented, which occurs because of the positional difference in the rotational direction of the elastic plate 2 in the respective printing stations. Accordingly, the strain resistant elements 10 to 13 and the terminal electrodes 14 to 19 are formed in the state in which they are accurately positioned. The qualities or characteristics of the produced pointing device 1 are stabilized.

Subsequently, the manipulation post 3 is attached to the elastic plate 2.

Next, the elastic plate 2 is mounted in the concavity 28 of the metallic plate 5 of the base plate 4. Before the elastic plate 2 is mounted, first, solder paste or an electroconductive adhesive is applied to electrically connect the terminal electrodes 14 to 19 to the connecting lands 35 to 40. It is relatively difficult to apply the above-mentioned solder past or the conductive adhesive to the connecting lands 35 to 40 in the concavity 28 by printing. Thus, preferably, the paste or adhesive is printed onto the terminal electrodes 14 to 19 of the elastic plate 2.

Then, the elastic plate 2 is placed in a predetermined position in the concavity 28. For this purpose, it is necessary to position the terminal electrodes 14 to 19 formed on the lower surface of the elastic plate 2 and the connecting lands 35 to 40 formed on the upper surface of the flexible wiring substrate with respect to each other. However, it is substantially impossible to visually recognize both of the terminal electrodes 14 to 19 and the connecting lands 35 to 40 at the same time.

Therefore, the pin 20 is inserted into the continuous perforations 31 and 33 formed in the base plate 4, and the pin 21 is inserted into the continuous perforations 32 and 34 (see FIG. 1 or 2). The pins 20 and 21 are positioned in the notches 22 and 23 of the elastic plate 2, respectively. While the pins 20 and 21 are used as guides, the elastic plate 2 is placed in the concavity 28 of the base plate 4.

According to the above-described method, the elastic plate 2 and the flexible wiring substrate 6 are accurately positioned with respect to each other, although the positions of the terminal electrodes 14 to 19 of the elastic plate 2 and those of the connecting lands 35 to 40 of the flexible wiring substrate 6 cannot be visually confirmed.

Subsequently, to electrically connect and mechanically fix the terminal electrodes 14 to 19 to the connecting lands 35 to 40, re-flowing of the solder is carried out. Even if the elastic plate 2 is shifted to some degree from a desired position on the flexible wiring substrate 6, the elastic plate 2 can be recovered to the desired position due to the surface tension of the solder, which occurs at the re-flowing of the solder. In other words, relatively large correcting self-alignment action works. Thus, the plurality of terminal electrodes 14 to 19 and the plurality of connecting lands 35 to 40 are positioned with respect to each other more accurately and easily.

As described above, the conductive adhesive may be used instead of the solder for electrical connection of the terminal electrodes 14 to 19 to the connecting lands 35 to 40.

Figure 6:
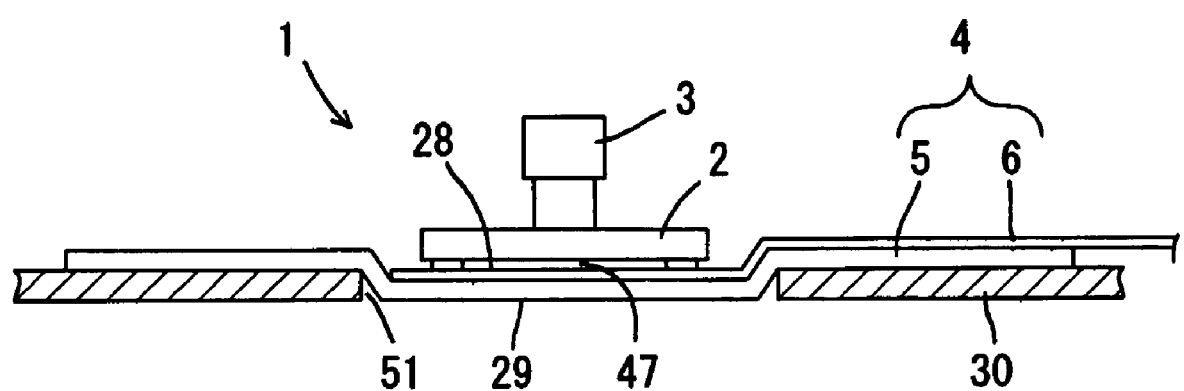
FIG. 6 is a partially front view of the pointing device according to the first preferred embodiment of the present invention attached to a support.

The pointing device 1 produced as described above is fixed to a support 30 such as a chassis provided on the keyboard side or other suitable device as shown in FIG. 6. In this case, the pointing device 1 is fixed to the support 30 by caulking or screwing using the fixing holes 25 and 26 formed in the metallic plate 5. The longitudinal directions of the fixing holes 25 and 26 are substantially perpendicular to each other. Thus, positional errors which may occur when the fixing is carried out by caulking or screwing are advantageously solved.

A hole 51 is provided in the support 30 to receive the convexity 29 of the metallic plate 5. A concavity may be provided instead of the hole 51. Thus, increasing of the thickness of the device, which may be caused by the convexity 29 of the metallic plate 5, is prevented. The concavity 28 of the metallic plate is effective in reducing the height of the pointing device 1 while the strength of the metallic plate 5 is maintained.

Figure 7:
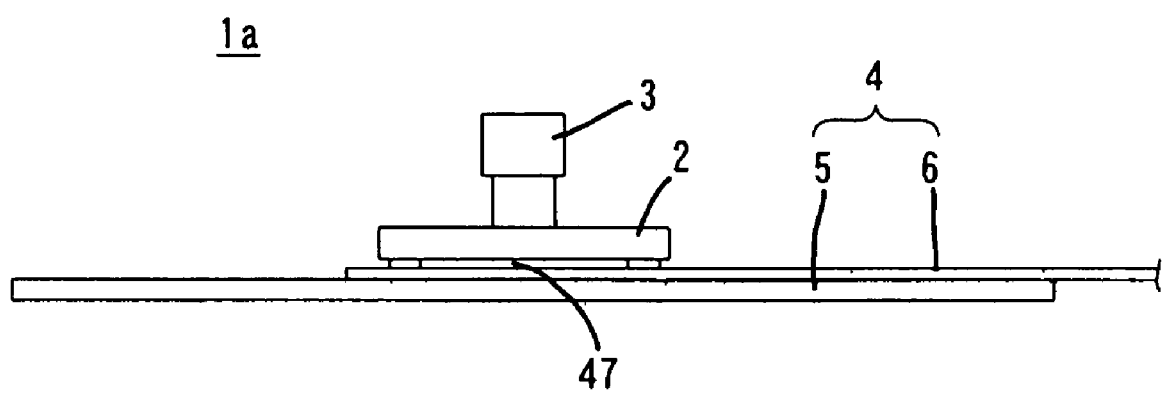
FIG. 7 is a front view of a pointing device according to the second preferred embodiment of the present invention.

FIG. 7 is a front view showing the second preferred embodiment of the present invention. In FIG. 7, the parts equivalent to those of FIG. 6 are designated by the same reference numerals, and the description is not repeated.

The pointing device 1a shown in FIG. 7 has the same structure as the pointing device 1 of FIG. 6 which is described with reference to FIGS. 1 to 6 except that the concavity 28 (see FIG. 6) is not formed in the base plate 4.

Even if no concavity is formed in the base plate 4 as seen in the pointing device 1a of FIG. 7, the elastic plate 2 can be deformed accurately correspondingly to the tilting operation of the manipulation post 3 provided that the terminal electrodes 14 to 19 (see FIG. 4) on the elastic plate 2 and the plurality of connecting lands 35 to 40 (see FIG. 2) on the flexible wiring substrate 6 are positioned with respect to each-other. Thus, advantageously, high precision alignment can be carried out with the pointing device 1a.

Moreover, the pointing device can be connected directly to a logic board (not shown) by use of the flexible wiring substrate 6. Thus, the pointing device 1a whose cost is low and structure is simple can be provided.

Moreover, in this preferred embodiment of the present invention, a process of re-flowing solder paste may be carried out to electrically connect and mechanically fix the terminal electrodes 14 to 19 to the connecting lands 35 to 40. In this case, self-alignment action works. Thus, even if the elastic plate 2 is shifted to some degree from a desired position on the flexible wiring substrate 6, the re-flowing of the solder can cause the elastic plate 2 to be recovered to the desired position. Thus, the position is corrected. Accordingly, the plurality of terminal electrodes 14 to 19 and the plurality of connecting lands 35 to 40 are accurately and easily positioned with respect to each other.

It should be understood that the foregoing description is only illustrative of the present invention. Various alternatives and modifications can be devised by those skilled in the art without departing from the present invention. Accordingly, the present invention is intended to embrace all such alternatives, modifications, and variances which fall within the scope of the appended claims.

What is claimed is:

1. A pointing device comprising:
    an elastic plate having a plurality strain resistant elements disposed on a lower surface of the elastic plate, a plurality of terminal electrodes disposed on the lower surface of the elastic plate, and a manipulation post arranged to extend from a center of an upper surface of the elastic plate, the plurality of terminal electrodes being electrically connected to the plurality of strain resistant elements; and
    a base plate on which the elastic plate is mounted and which supports an outer periphery of the elastic plate, the base plate being arranged with a predetermined gap with respect to the lower surface of the elastic plate and having a plurality of connecting lands electrically connected to the plurality of terminal electrodes;
    the elastic plate having a perforation or notch in at least one position thereof, the perforation or notch being arranged such that a pin can be inserted therein; and
    the elastic plate having a plane shape which is not rotation-symmetric.

2. A pointing device according to claim 1, wherein the elastic plate has perforations or notches in at least two positions thereof, the perforations or notches being arranged such that pins can be inserted therein.

3. A pointing device according to claim 1, wherein the base plate is provided with a perforation or notch which can receive a pin when the pin is inserted through the perforation or notch of the elastic plate mounted in a predetermined position.

4. A pointing device according to claim 1, wherein the base plate has a concavity formed in the upper surface thereof and the elastic plate is mounted in the concavity.

5. A pointing device according to claim 1, wherein the elastic plate is made of one of zirconia, a zirconia-type, and yttrium-stabilized zirconia ceramic.

6. A method of producing a pointing device defined in claim 1 comprising a step of forming the strain resistant elements and the terminal electrodes while a pin is inserted through the perforation or notch formed in the elastic substrate, so that the elastic plate is positioned.

7. A method of producing a pointing device defined in claim 6, comprising a step of mounting the elastic plate on the base plate while the pin is inserted through the perforation or notch formed in the elastic plate and through the perforation or notch formed in the base plate, so that the elastic plate and the base plate are positioned with respect to each other.

8. A pointing device according to claim 1, wherein the base plate includes a metallic plate;
the metallic plate includes a flexible wiring substrate disposed on an upper surface of the metallic plate and the plurality of connecting lands disposed on the upper surface of the metallic plate, the elastic plate being mounted on the metallic plate via the flexible wiring substrate;
the plurality of terminal electrodes and the plurality of connecting lands are arranged in a circle and are electrically connected to each other via an electroconductive bonding-material;
the predetermined gap is formed between the lower surface of the elastic plate and the upper surface of the flexible wiring substrate; and
the elastic plate can be deformed due to the predetermined gap.

9. A pointing device according to claim 8, wherein the electroconductive bonding material is solder which is applied by re-flowing.

10. A pointing device comprising:
an elastic plate having a plurality of strain resistant elements disposed on a lower surface of the elastic plate, a plurality of terminal electrodes disposed on the lower surface of the elastic plate, and a manipulation post arranged to extend from a center of an upper surface of the elastic plate, the plurality of terminal electrodes being electrically connected to the plurality of strain resistant elements; and
a base plate on which the elastic plate is mounted and which supports an outer periphery of the elastic plate, the base plate being arranged with a gap with respect to the lower surface of the elastic plate and having the plurality of connecting lands electrically connected to the plurality of terminal electrodes; and
the base plate having a concavity formed therein, the elastic plate being mounted in the concavity.

11. A pointing device according to claim 10, wherein the base plate includes a metallic plate;
the metallic plate includes a flexible wiring substrate disposed on an upper surface of the metallic plate and the connecting lands disposed on the upper surface of the metallic plate;
the metallic plate has the concavity formed on the upper surface of the metallic plate;
the metallic plate has a convexity formed on the lower surface thereof in a position corresponding to the concavity;
the flexibility wiring substrate is arranged to extend in the concavity; and
the elastic plate is mounted in the concavity via the flexible wiring substrate.

12. A pointing device according to claim 11, further comprising a support for supporting the metallic plate from a lower surface side thereof, the support has a hole or concavity which receives the convexity of the metallic plate.

13. A pointing device according to claim 10, wherein the elastic plate has a perforation or notch formed in at least one position thereof, the perforation or notch being arranged such that a pin can be inserted through the perforation or notch.

14. A pointing device according to claim 13, wherein the base plate is provided with a perforation or notch which can receive a pin when the pin is inserted through the perforation or notch of the elastic plate mounted in a predetermined position.

15. A pointing device according to claim 13, wherein the elastic plate has perforations or notches in at least two positions thereof, the perforations or notches being arranged such that pins can be inserted therein; and
the elastic plate has a plane shape which is not rotation-symmetric.

16. A pointing device according to claim 8, wherein the elastic plate is made of one of zirconia, a zirconia-type, or yttrium-stabilized zirconia ceramic.

17. A pointing device according to claim 1, further comprising an overcoat layer covering the strain resistant elements and not covering main portions of the terminal electrodes.

18. A pointing device according to claim 8, wherein the metallic plate is made of iron or an iron alloy.

19. A pointing device according to claim 18, wherein a surface of the metallic plate is anti-rusting-treated.

20. A pointing device according to claim 8, wherein the metallic plate includes at least two fixing holes;
the at least two fixing holes include a first and a second fixing hole having a longer size in one direction thereof; and
the longer size direction of the first fixing hole is substantially perpendicular to the longer size direction of the second fixing holes.

* * * * *